UNITED STATES PATENT OFFICE.

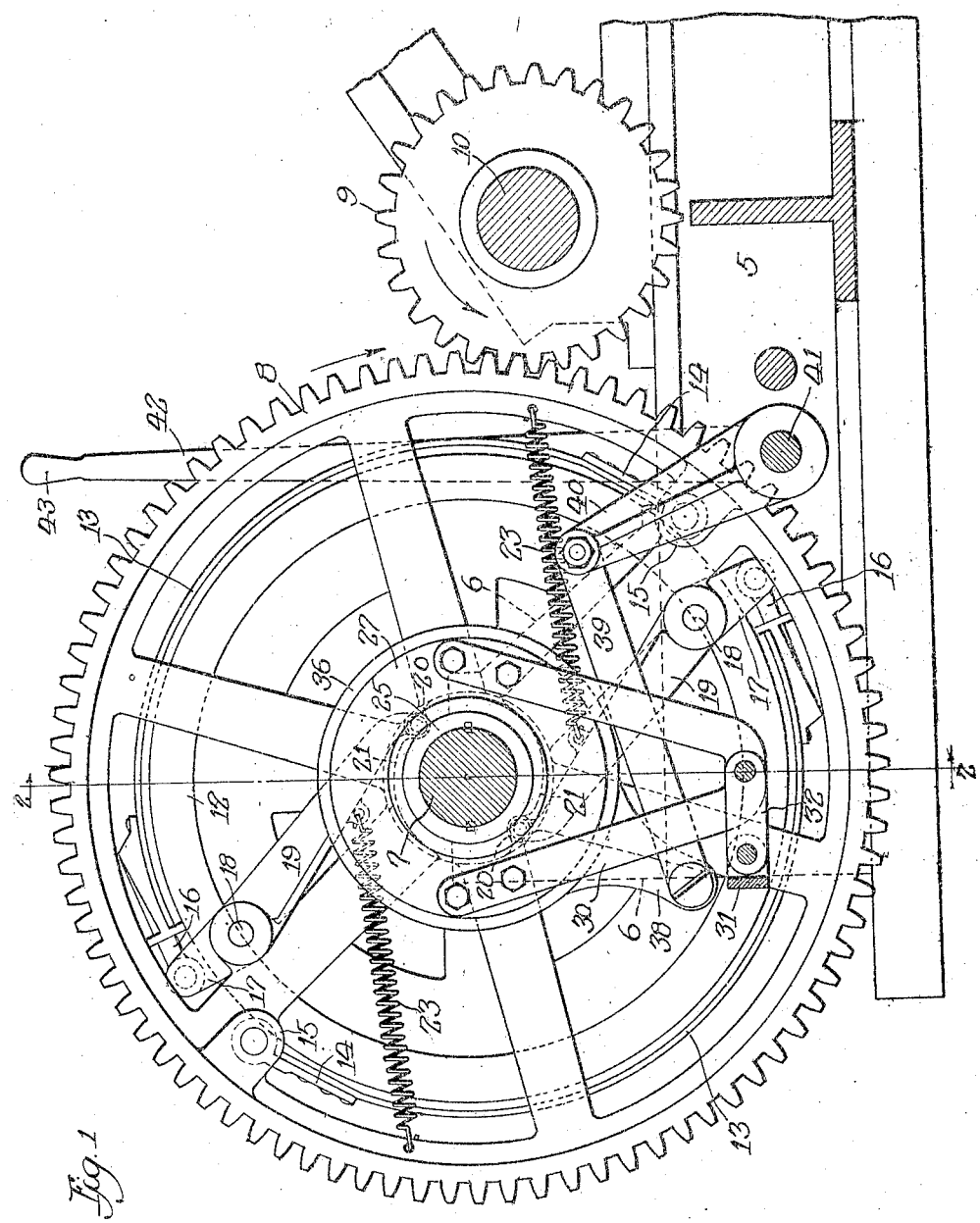

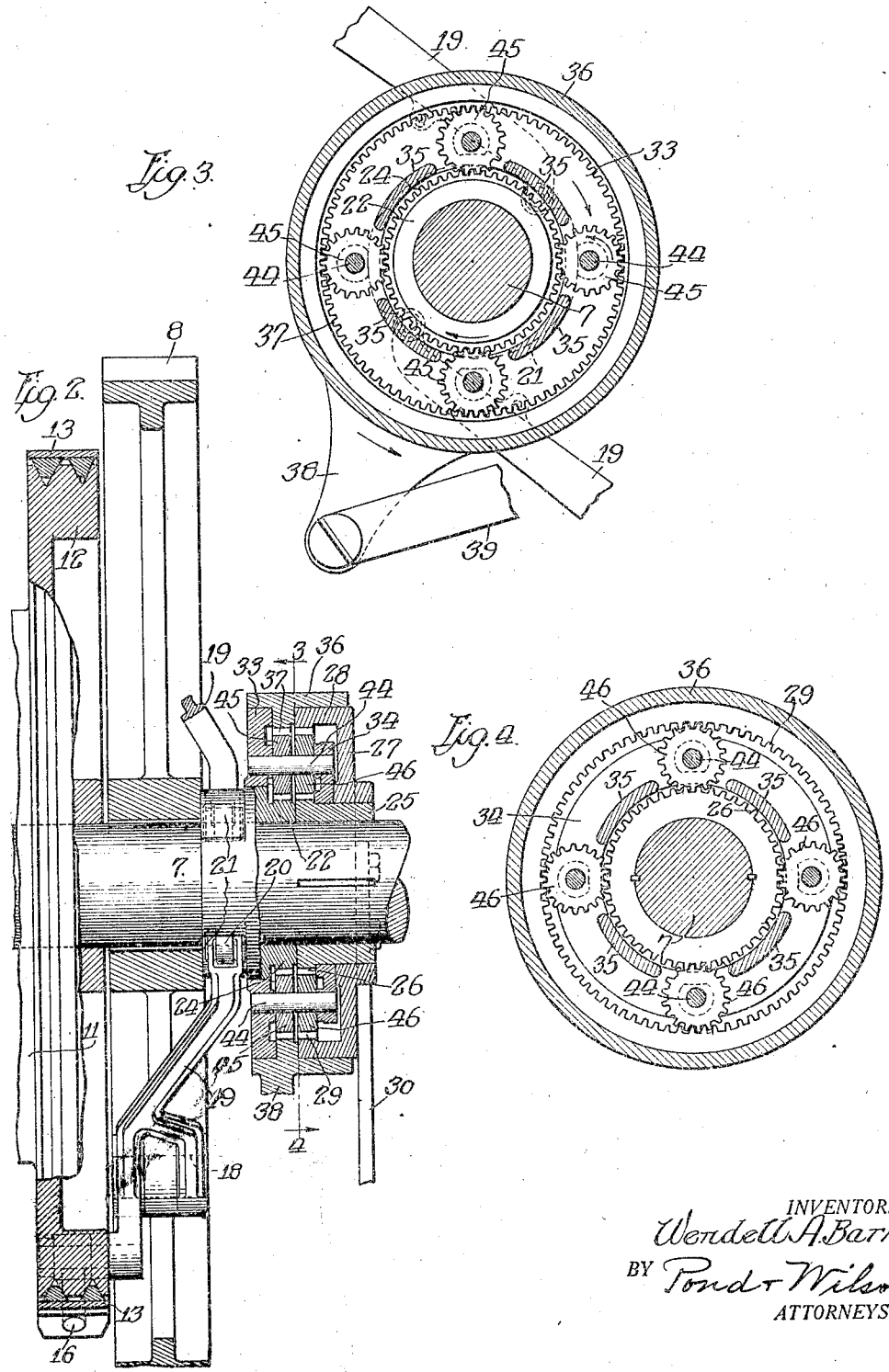

WENDELL ADDISON BARKER, OF CHICAGO, ILLINOIS.

CLUTCH-OPERATING MEANS.

1,270,255.

Specification of Letters Patent. Patented June 25, 1918.

Application filed June 2, 1917. Serial No. 172,360.

*To all whom it may concern:*

Be it known that I, WENDELL A. BARKER, a citizen of the United States, residing at Chicago, in the county of Cook and State of Illinois, have invented certain new and useful Improvements in Clutch-Operating Means, of which the following is a specification.

This invention relates to improvements in clutch-operating means chiefly designed for use in connection with that type of hoisting machines wherein a winding drum or spool carrying a rope or cable is loosely mounted on a shaft and is actuated and controlled by a friction band or bands carried by a continuously rotating wheel or disk and adapted to grip or release a head or flange of the drum. The principal object of the invention is to provide an improved mechanism for effecting the application and release of the friction band or bands during and without interrupting the turning movement of the continuously rotating wheel or disk carrying the same.

The subject matter of the invention, its principle of operation, and the advantages inhering therein will be readily understood and appreciated by those skilled in the art from a consideration of the following detailed description taken in connection with the accompanying drawings, forming a part of this specification, wherein—

Figure 1 is a side elevation, partly in vertical section, of a hoisting machine embodying my present improvements.

Fig. 2 is an enlarged vertical section on the line 2—2 of Fig. 1, with the cam sleeve shown partly in elevation.

Fig. 3 is a section on the line 3—4 of Fig. 2, looking in the direction of the arrow 3.

Fig. 4 is also a section on the line 3—4 of Fig. 2, looking in the direction of the arrow 4.

Referring to the drawings, 5 designates the machine bed, on either side of which is a side frame 6, in the upper portions of which latter is suitably journaled a drum shaft 7. Keyed on the shaft 7 is a large spider gear 8 that meshes with and is driven by a pinion 9 fast on the shaft 10 of an electric or other suitable motor (not shown). Loose on the shaft 7 is the winding drum or spool 11 on which is wound the usual rope or cable (not shown). The spool 11 is provided at one end with a head or flange 12, that coöperates with a pair of duplicate clutch-straps 13 that are mounted on the inner face of the large gear 8; each of these straps being anchored at one end through a metal fastener 14 to a lug or bracket 15 on the gear 8, and at its other end being pivotally connected through a fastening member 16 to the outer end of the short arm 17 of a lever that is pivoted at 18 to the spider gear 8 and has an inwardly extending arm 19 that carries at its free end a roller 20. The arms 19 of these levers are actuated outwardly radially of the gear 8, to apply the friction clutch straps to the head or flange of the drum when the latter is to be rotated, by the agency of a pair of low cams 21 formed on the periphery of a cam sleeve 22 that is rotatably mounted on the shaft 7 alongside the hub of gear 8; said roller being held in engagement with said cams by tensile springs 23 anchored at one end to the long arms 19 of the levers and at the other end to the rim of the gear 8, as clearly shown in Fig. 1.

The sleeve 22 has formed thereon a gear 24, and keyed to the shaft 7 is another sleeve 25 on which is formed a gear 26 of the same size as gear 24 and lying alongside the latter. Mounted on the sleeve 25 is a housing member 27 formed with an inwardly projecting rim 28 that carries an internal gear 29. The member 27 is held stationary by means of a metal yoke strap 30 (Fig. 1) that is secured to a transverse element 31 of the machine frame by a link 32. A spider consisting of side plates 33 and 34 and connecting webs 35 (Figs. 3 and 4) is rotatably mounted on the sleeves 22 and 25. Surrounding and rotatably engaging the rim 28 and the periphery of the spider plate 33 is a ring 36 formed with an internal gear 37 of the same size as the internal gear 29 and lying alongside the latter. Extending radially of the ring 36 is an arm 38 that is connected by a link 39 (Fig. 1) to an arm 40 fast on a rock-shaft 41 journaled in the bed frame of the machine. Fast on one end of shaft 41 is an operating arm 42 terminating in a handle 43.

Mounted on pins 44 extending between and carried by the spider plates 33 and 34 is a series of planet gears 45, herein shown as four in number, that mesh with the gears 24 and 37, and mounted on the same pins 44 is a similar series of four planet gears 46 of the same size as the gears 45 and lying alongside the latter, the gears 46 meshing with the gears 26 and 29.

In the operation of the machine, when the lever arms 19 engage the low ends of the cams 21, as shown in the drawings, the clutch straps are out of gripping engagement with the head of the drum, and, by means of the planetary gearing shown and described, the cam sleeve 22 is caused to rotate in the same direction and at the same speed as the shaft 7. In other words, there is no relative rotation between them. Consequently, since the gear 8 which carries the levers rotates with the shaft 7, there is no actuation of the levers. When, now, it is desired to apply the clutch straps, the arm 42 is swung to the right in Fig. 1, which imparts a rotative movement to the internal gear 37 in a counter-clockwise direction, viewing Figs. 1 and 3. This accelerates the rotation of the planet gears 45, which latter, in turn, impart an accelerated rotation to the cam sleeve 22, causing the latter to run ahead of the shaft 7, and causing the cams 21 to act on the levers and apply the clutch-straps to the head of the drum. As soon as this manually effected rotative movement of the internal gear 37 ceases, the cam sleeve and shaft again rotate at the same speed, and as the cam surfaces are low and long and the thrust of the lever arms is substantially normal thereto, no locking means is required to prevent backward rotation of the cams while holding the clutch-straps applied. When the clutch-straps are to be released, the arm 42 is swung in the reverse direction, which imparts a rotative movement to the internal gear 37 in a clockwise direction viewing Figs. 1 and 3. This retards the rotation of the planet gears 45, and these latter, in turn, impart a relative backward rotation to the cam sleeve 22, whereupon the springs 23 act to draw the lever arms 19 inwardly and release the clutch-straps from the head of the drum.

It will be seen that, by a simple manipulation of the operating arm 42 the clutch-strap may be caused to engage or disengage the cable winding-drum of the machine without the necessity of starting or stopping the motor and during the continuous rotation of the main drum shaft. While the result is broadly old in patents heretofore granted to me, the mechanism herein described and claimed effects the result in a superior manner, with a greater economy of space, and with less wear and strain on the parts.

I claim:

1. In a clutch-operating means, the combination with a continuously rotating shaft, and a winding drum loose on said shaft, of a gear fast on said shaft, a lever pivoted on said gear, a clutch strap secured at one end to said gear and at its other end to one arm of said lever and adapted to engage said drum, a cam sleeve loose on said shaft and carrying a cam engaging the other arm of said lever, a planetary gear transmission mechanism intermediate said shaft and cam sleeve normally rotating the latter in the same direction and at the same speed as said shaft, and means for effecting a rotative movement of an element of said transmission mechanism while said shaft is rotating whereby to accelerate or retard the rotative movement of said cam sleeve relatively to that of said shaft.

2. In a clutch operating means, the combination with a continuously rotating shaft, and a winding drum loose on said shaft, of a gear fast on said shaft, a lever pivoted on said gear, a clutch-strap secured at one end to said gear and at its other end to one arm of said lever and adapted to engage said drum, a cam sleeve loose on said shaft and carrying a cam engaging the other arm of said lever, a planetary gear transmission mechanism concentric with said shaft intermediate the latter and said cam sleeve and normally rotating the latter in the same direction and at the same speed as said shaft, and means for effecting a rotative movement of an element of said transmission mechanism while said shaft is rotating whereby to accelerate or retard the rotative movement of said cam sleeve relatively to that of said shaft.

3. In a clutch operating means, the combination with a continuously rotating shaft, and a winding drum loose on said shaft, of a gear fast on said shaft, a lever pivoted on said gear, a clutch-strap secured at one end to said gear and at its other end to one arm of said lever and adapted to engage said drum, a cam sleeve loose on said shaft and carrying a cam engaging the other arm of said lever, a planetary gear transmission mechanism concentric with said shaft intermediate the latter and said cam sleeve and normally rotating the latter in the same direction and at the same speed as said shaft, said transmission mechanism including an angularly shiftable internal gear, and manually operable means for shifting said internal gear in either direction during the rotation of said shaft whereby to accelerate or retard the rotative movement of said cam sleeve relatively to that of said shaft.

4. In a clutch operating means, the combination with a continuously rotating shaft, and a winding drum loose on said shaft, of a gear fast on said shaft, a lever pivoted on said gear, a clutch-strap secured at one end to said gear and at its other end to one arm of said lever and adapted to engage said drum, a cam sleeve loose on said shaft and carrying a cam engaging the other arm of said lever, a gear on said cam sleeve, a sleeve fast on said shaft and carrying a gear of the same size as said cam-sleeve gear, a spider journaled on said sleeves and carrying two series of planetary gears meshing with said sleeve gears respectively, a stationary internal gear meshing with one series of planetary gears, an angularly shiftable internal gear meshing with the other series of planetary gears, and manually operable means for shifting said last named internal gear in either direction during the rotation of said shaft whereby to accelerate or retard the rotative movement of said cam sleeve relatively to that of said shaft.

WENDELL ADDISON BARKER.